United States Patent [19]

Kronenberg

[11] Patent Number: 5,171,982
[45] Date of Patent: Dec. 15, 1992

[54] DISPLAY DEVICE WITH PHOTOELECTRIC SENSING OF UNEVENLY SPACED MARKS ON A CODING DISK

[75] Inventor: Klaus Kronenberg, Schwalbach, Fed. Rep. of Germany

[73] Assignee: VDO Adolf Schindling AG, Frankfurt am Main, Fed. Rep. of Germany

[21] Appl. No.: 738,578

[22] Filed: Jul. 31, 1991

[30] Foreign Application Priority Data

Aug. 25, 1990 [DE] Fed. Rep. of Germany ....... 4026915

[51] Int. Cl.⁵ .............................................. G01D 5/34
[52] U.S. Cl. ................................ 250/231.13; 340/825
[58] Field of Search ................. 250/231.13, 231.11, 250/231.14, 231.15; 340/825, 825.17, 825.31, 825.56; 341/35, 192

[56] References Cited

U.S. PATENT DOCUMENTS

| | | |
|---|---|---|
| 3,982,106 | 9/1976 | Stutz . |
| 4,037,219 | 7/1977 | Lewis ................. 250/231.15 |
| 4,326,415 | 4/1982 | Lee ..................... 250/231.13 |
| 4,560,983 | 12/1985 | Williams ............... 340/825 |

FOREIGN PATENT DOCUMENTS 1126506 8/1989 Japan .

Primary Examiner—David C. Nelms
Assistant Examiner—Que T. Le
Attorney, Agent, or Firm—Martin A. Farber

[57] ABSTRACT

For a display device with scale (4), pointer (5), stepping motor (1), gearing (2) and control means (7) in which a plurality of revolutions of the stepping motor (1) corresponds to the entire display range and the control means (7) contains a step counter with reversibly unambiguous association of number of steps and display value, a possibility for the continuous adjustment of the step counter (1) with the actual pointer position is created by a coding disk (3) which is connected, fixed for rotation, with the shaft (6) of the pointer (6). The disk has a number of markings (9) arranged at different distances apart on its periphery and having a sensor (8). By a comparison of the actual number of steps with a reference number of steps stored in a table for each of the markings (9), it can be determined whether the association between number of steps and pointer position is correct or must be readjusted.

4 Claims, 2 Drawing Sheets

DISPLAY DEVICE WITH PHOTOELECTRIC SENSING OF UNEVENLY SPACED MARKS ON A CODING DISK

FIELD AND BACKGROUND OF THE INVENTION

The present invention relates to a display device with scale, pointer, stepping motor, gearing and control means in which a plurality of revolutions of the stepping motor corresponds to the entire display range, and the control means contains a step counter with reversibly unambiguous association of number of steps and display value.

The proper association of display value and number of steps is checked upon the manufacture of the display device or upon its initial placing in operation and, if necessary, adjusted. This adjustment is not sufficient for dependable operation since the correct association can be interfered with by interruption of the source of power or by the effect of electromagnetic waves.

A method has already been proposed (German OS 39 21 462) for a stepping motor having multiple windings in which the voltage induced by a movement of the stepping motor in a winding not required at the time for the drive is evaluated. The evaluation is effected in the manner that each time that the stepping motor is placed in operation, a test program is first performed in which the stepping motor is moved further in a predetermined direction until the pointer comes to a stop at the end of the scale, this being noted by the absence of an induced voltage when the stepping motor is stopped. The test program is thus completed and the step counter can be set to the corresponding value. The display device is now readjusted and is ready for operation.

By this method, automatic adjustment can be effected upon each connection and/or disconnection of the display device. However, this cannot be employed for all cases of use since the association of number of steps and display value may be disturbed also during operation, for instance by electromagnetic radiation acting temporarily from the outside on the counter or by strong mechanical vibrations.

SUMMARY OF THE INVENTION

It is an object of the invention to provide a display device of the aforementioned type with a possibility of adjustment which permits testing the association during operation and which does not require an adjustment of the stop in accordance with German OS 39 21 462.

According to the invention there is provided a display device which is characterized by:

a) A coding disk (3) which is attached, fixed for rotation, to the shaft (6) of the pointer (5), the disk having a plurality of markings (9) arranged on its periphery, every two adjacent markings being at an angular distance apart which differs from the angular spacings between all other ones of the markings (9);

b) A sensor (8) which is arranged fixed in position with respect to the markings and has a connected step counter; and by c) A table, stored in the control means, of step numbers which correspond to the angular spacings between the markings (9).

It is particularly advantageous for the markings (9) to be so arranged on the coding disk (3) that the smaller angular spacings are associated with the region of the statistically most frequent position of the pointer.

The markings (9) may suitably consist of light-pervious slits in a light-impervious coding disk (3), the sensor (8) being then developed as light barrier.

The inventive concept proceeds from the basis that during operation, the pointer of the display device preferably does not assume merely one specific position but rather passes over the entire display range, or at least establishes itself continuously at different positions within a part of the range.

As a result of this "dynamic" behavior, it is possible, by means of the sensor element and the coding disk, to obtain continuous reports on the number of steps between two successive signals which are produced by the markings in the sensor and thus obtain a measure of the angular spacing last passed through. The number of steps corresponding to the angle spacings is compared in the control unit with the number of steps stored in the table. Since, in accordance with the invention, each angular spacing appears only once and the direction of rotation is also noted in the counter by progressive or degressive counting, the marking last passing the sensor of each angular spacing defined by two markings can have a very specific angle or display value associated with it and this value can be compared with the value in the step counter. If display value and number of steps do not agree, the stepping counter of the stepping motor is corrected accordingly. In this way, the display device is reset whenever a marking of the coding disk passes the sensor element and thus brings about a new counting process. By the association of the smaller angular spacings between the markings with the region of the statistically most frequent position of the pointer, the result is obtained that adjustment takes place as frequently as possible, i.e. that the display device tests and adjusts itself practically continuously during operation, so that an erroneous display resulting from the aforementioned disturbances is practically out of the question. The display device of the invention has the further advantage that no resetting of the pointer at the stop is necessary for the adjustment.

BRIEF DESCRIPTION OF THE DRAWING

With the above and other objects and advantages in view, the present invention will become more clearly understood in connection with a detailed description of the preferred embodiment, when considered with the accompanying drawings, of which.

DETAILED DESCRIPTION OF THE PREFERRED EMBODIMENT

Figure 1:
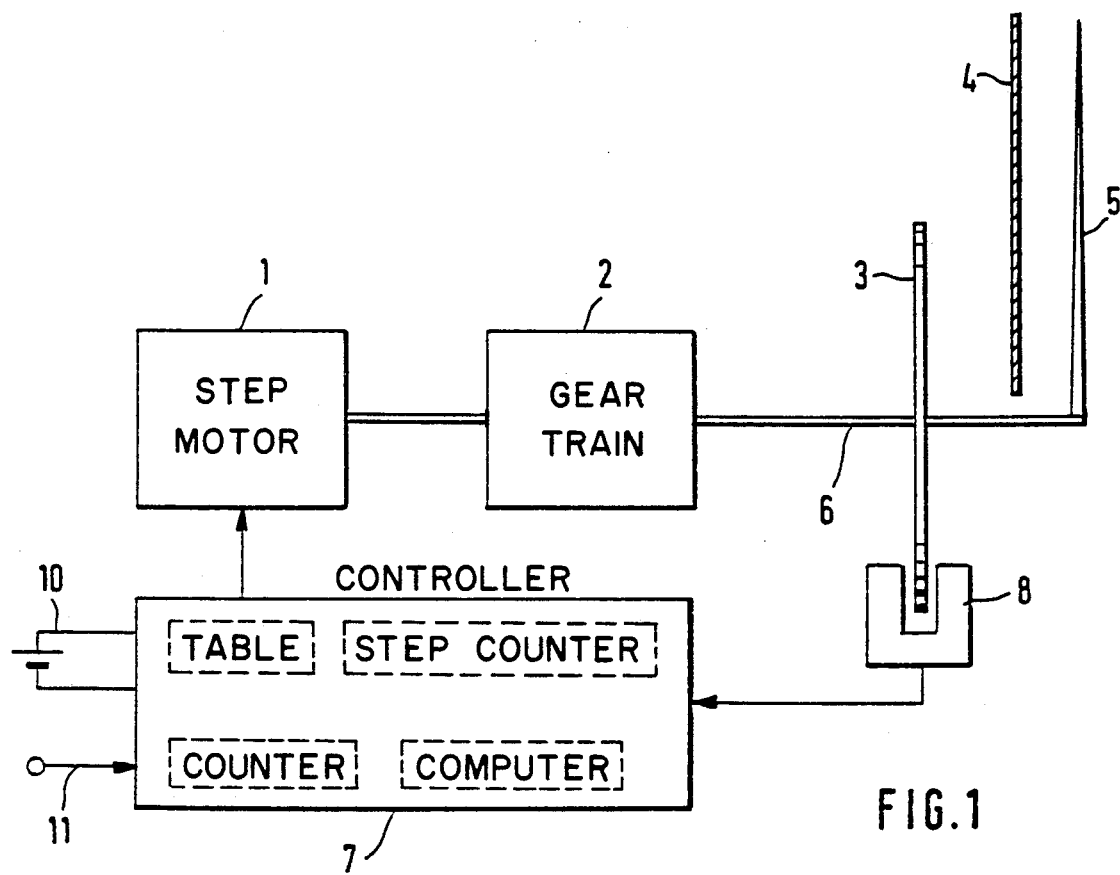
FIG. 1 shows diagrammatically the basic construction of the display device.

FIG. 1 shows, greatly simplified, a stepping motor 1 and a gearing 2 such as are customary in modern display devices. The stepping motor 1 is controlled by a control means 7 in which a measurement signal arriving via line 11 is processed and converted into a stepping command for the stepping motor. The stepping command depends for its sign and magnitude on a difference between the instantaneous position of the pointer, or the associated number of steps, and the number of steps resulting from the measurement signal. The shaft 6 of the pointer 5 is turned accordingly via the gearing 2. Numeral 4 represents a scale indicated in sectional view.

The coding disk 3 is furthermore arranged fixed for rotation on the shaft 6. When the edge markings 9 (FIG. 2) of the disk 3 pass the sensor 8, a signal is produced in the latter, this signal causing the commencement of a new counting process in the connected step counter. The step counter is a part of the control means 7 and is not shown in detail separately.

The control means 7 has a source of power 10. It contains at least two counters and a computer. The signal provided by the sensor 8 causes the number of steps present at this time in the corresponding counter to be compared with the number of steps (the angle spacings) stored in a table. Also, the angular value corresponding to the signal-producing marking or the corresponding "correct" number of steps is thus identified. This "correct" number of steps is compared with the number of steps present in the step counter of the stepping motor. As long as no disturbance has occurred, the two numbers of steps agree with each other. If a disturbance has occurred, the step counter of the stepping motor is corrected accordingly, i.e. readjusted. In this way, the correct association of pointer position and number of steps is again restored.

Figure 2:
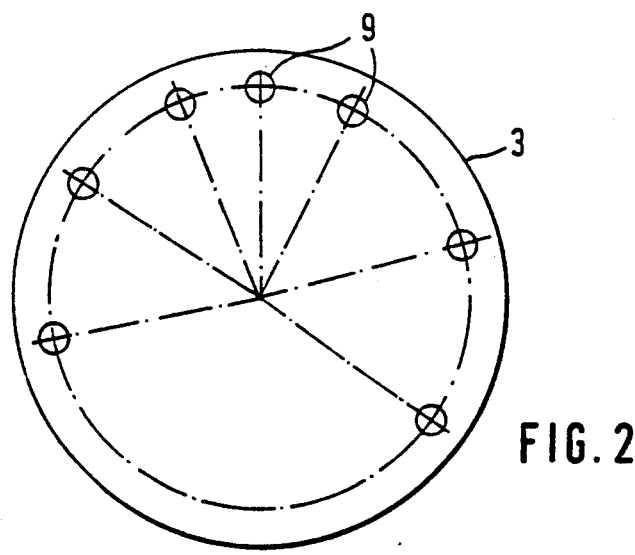
FIG. 2 shows the coding disk.

FIG. 2 shows how the markings 9 are arranged on the coding disk 3. Seven markings are shown, it being clearly shown that the angular spacings between two adjacent markings 9 are all different.

Figure 3:
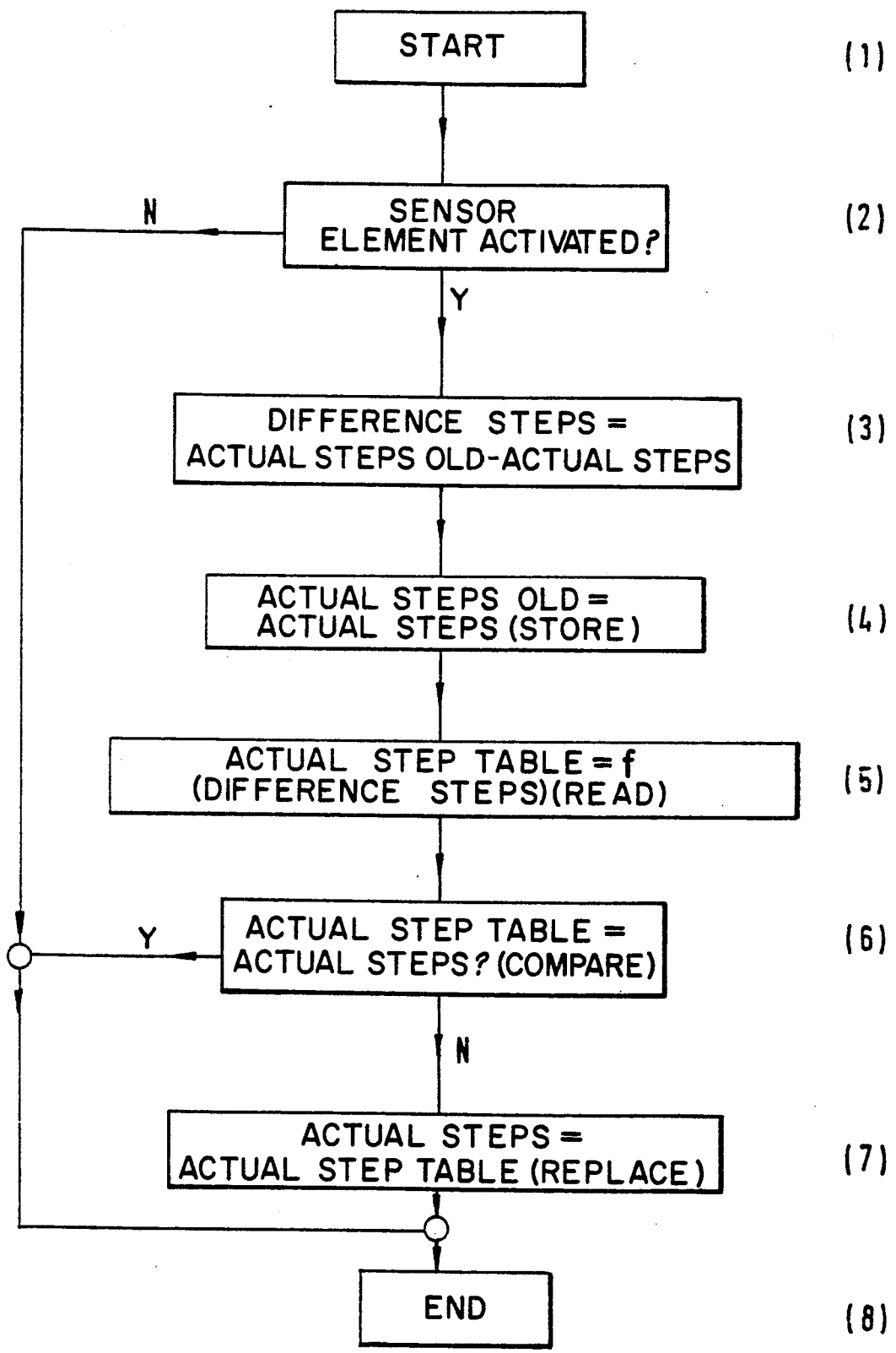
FIG. 3 is a flow chart of the test program.

FIG. 3 shows a flow chart for the computer processes in the control means 7 insofar as they relate to the automatic adjustment during operation in accordance with the invention.

The start of the adjustment process is characterized by "start" (1). A check is first of all made as to whether the sensor is activated (2), i.e. whether one of the markings of the coding disk is opposite the sensor. If not, then no adjustment process is introduced. If the sensor is activated, a calculation of the difference in number of steps since the last activation of the sensor is effected with due consideration of the direction of rotation (3). Specifically, not only the difference in number of steps but also their sign is determined, and it is determined whether counting has been effected in upward or downward direction. The actual position of the coding disk or the pointer resulting from this is stored (4). Thereupon the reference number of steps corresponding to the actual position is read from the table (5) and compared with the actual number of steps (6). If they agree, then the program continues until the end (8). If the actual number of steps and the reference number of steps do not agree, then the actual number of steps is replaced by the reference number of steps in the step counter of the stepping motor (7). In this way, the adjustment process is completed and the end (8) of the program reached.

I claim:

1. A display device comprising;
   a scale, a pointer, a stepping motor, gearing, and control means;
   wherein the pointer is moveable along the scale to produce an indication thereon, the motor is operatively coupled via the gearing to the pointer for positioning the pointer along the scale, and the control means imparts signals to the motor for activating the motor to move the pointer;
   a plurality of revolutions of the stepping motor corresponds to an entire display range, the control means including a step counter with reversibly unambiguous association of a number of steps of the motor and a display value presented by the pointer upon the scale;
   the device further comprising a shaft interconnecting the gearing with the pointer;
   a coding disk which is attached, fixed for rotation, to the shaft, the disk having a plurality of markings arranged on its periphery with every two adjacent markings being at an angular distance apart which differs from the angular spacings between all other pairs of successive ones of the markings;
   a sensor which is arranged fixed in position with respect to the markings of the coding disk;
   a step counter operatively coupled to the sensor for counting signals outputted by the sensor; and
   a table, stored in the control means, of step numbers which correspond to the angular spacings between successive ones of the markings; and
   wherein the control means employ data of the table and data of the step counter to correct position of the pointer.

2. A display device according to claim 1, wherein the markings are arranged on the coding disk such that the smaller angular spacings are associated with a region of statistically most frequent positions of the pointer.

3. A display device according to claim 2, wherein the markings are made of light-pervious slits in a light-impervious material of the coding disk, the sensor being then developed as light barrier with means for sensing light passing through a slit.

4. A display device according to claim 1, wherein the markings are made of light-pervious slits in a light-impervious material of the coding disk, the sensor being then developed as light barrier with means for sensing light passing through a slit.

* * * * *